Feb. 18, 1964 D. S. WELSHON 3,121,767
METHOD AND APPARATUS FOR FABRICATING
SHEET FORMED MOLDED ARTICLES
Filed May 10, 1961 3 Sheets-Sheet 1
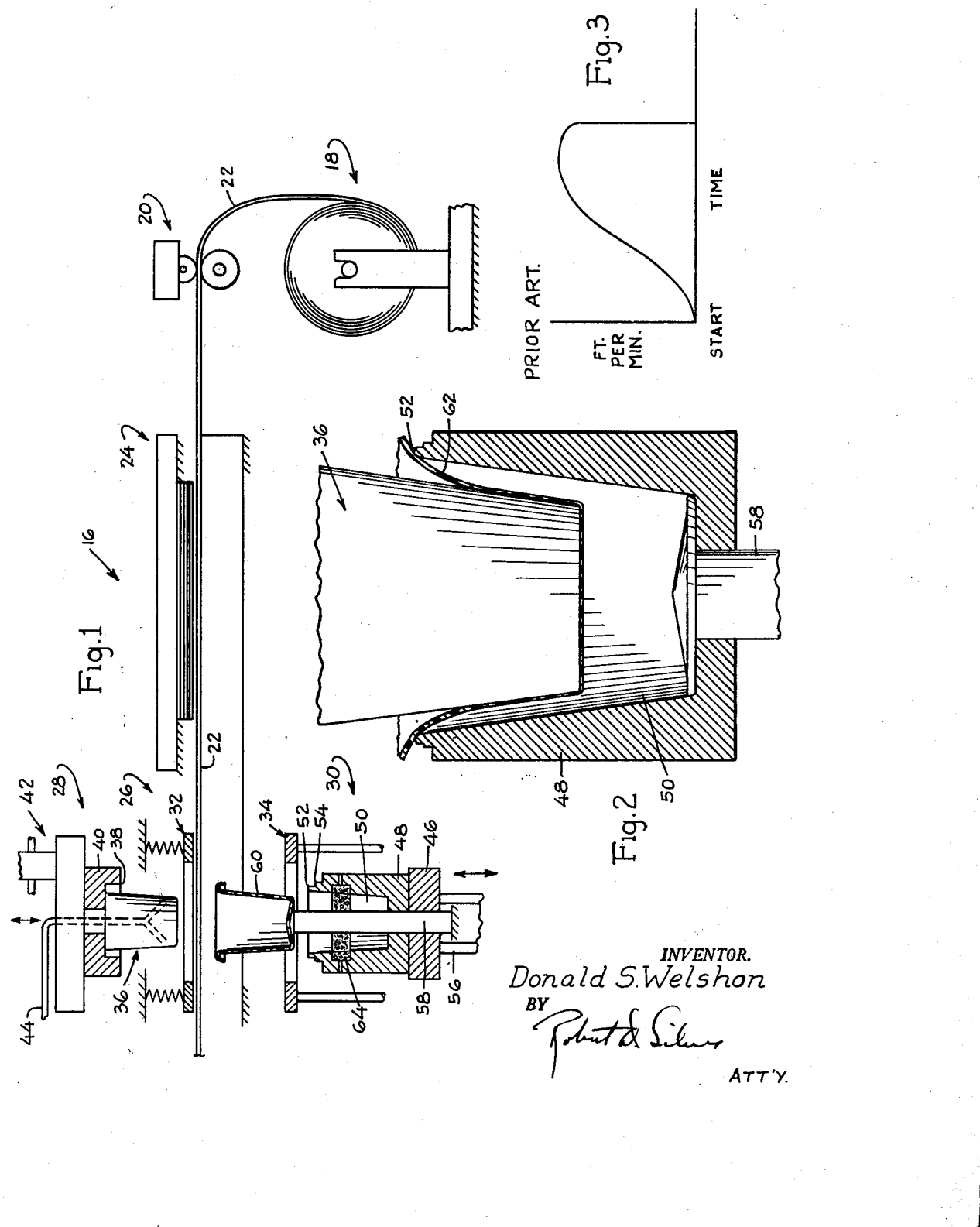
INVENTOR.
Donald S. Welshon
BY
ATT'Y.

Feb. 18, 1964  D. S. WELSHON  3,121,767
METHOD AND APPARATUS FOR FABRICATING
SHEET FORMED MOLDED ARTICLES
Filed May 10, 1961  3 Sheets-Sheet 2

INVENTOR.
Donald S. Welshon
BY
ATT'Y

Feb. 18, 1964 D. S. WELSHON 3,121,767
METHOD AND APPARATUS FOR FABRICATING
SHEET FORMED MOLDED ARTICLES
Filed May 10, 1961 3 Sheets-Sheet 3

INVENTOR.
Donald S. Welshon
BY
ATT'Y.

United States Patent Office 3,121,767
Patented Feb. 18, 1964

3,121,767
METHOD AND APPARATUS FOR FABRICATING SHEET FORMED MOLDED ARTICLES
Donald S. Welshon, Elmhurst, Ill., assignor to Illinois Tool Works Inc., a corporation of Delaware
Filed May 10, 1961, Ser. No. 109,095
2 Claims. (Cl. 264—292)

This invention relates in general to the method and apparatus for making patterns in plastic articles formed from sheet stock. More particularly, the invention relates to the method and apparatus for molding articles from a uniform web of plastic material and to provide patterns wherein there are thin and thick sections on the finished articles.

Sheet forming molding techniques, usually described as vacuum forming and blow molding enjoy the economic advantage of permitting multiple molding, fast cycling, relatively inexpensive tooling and high precision as compared with many other molding techniques. Heretofore, these processes have been limited to manufacturing articles having a substantially uniform wall thickness or to articles where there is a linear change in wall thickness.

This invention is concerned with the method and apparatus for selectively providing thickened portions on sheet formed articles in desired pattern and location. This approach leads to many new article devices having commercial significance. The invention is directed towards the concept of manipulating the relative movement of the male and female mold members so that the expansion or stretching of the plastic heated material in the mold will not be uniform. Thus, selectively thickened and thin portions of the wall are formed in the articles of manufacture. This method and apparatus accomplishes these ends without detraction from the general advantages that accrue to well known sheet forming methods. Further, controlled thickness may be afforded to desired portions of an article such that new articles heretofore unavailable by sheet forming techniques can now be made.

It is thus the general object of this invention to provide an improvement to the sheet forming molding processes which affords selectively thickened and thin areas on the article being molded.

It is a further object of this invention to provide a method and apparatus which uniformly heats a plastic web of material to permit the stretching thereof and then in the molding operation selectively causes the cooling of certain portions of the heated material so that the cool portion will not stretch or thin under pressure to as great an extent as the non-cooled portion.

The novel features which are characteristic of the invention are set forth with particularity in the appended claims. The invention, both as to its organization and operation, together with additional objects and advantages thereof, will be best understood by the following description of specific embodiments in conjunction with the accompanying drawings in which:

FIG. 1 is a side elevational view, somewhat diagrammatic in form, and portions thereof being in section, showing apparatus for molding of articles of manufacture from sheet plastic material;

FIG. 2 is a somewhat diagrammatic showing of the prior art method of molding to produce articles having substantially uniform wall thickness;

FIG. 3 is a graph showing the prior art relative to telescoping movement of the male and female mold members plotted against time;

Figure 4:
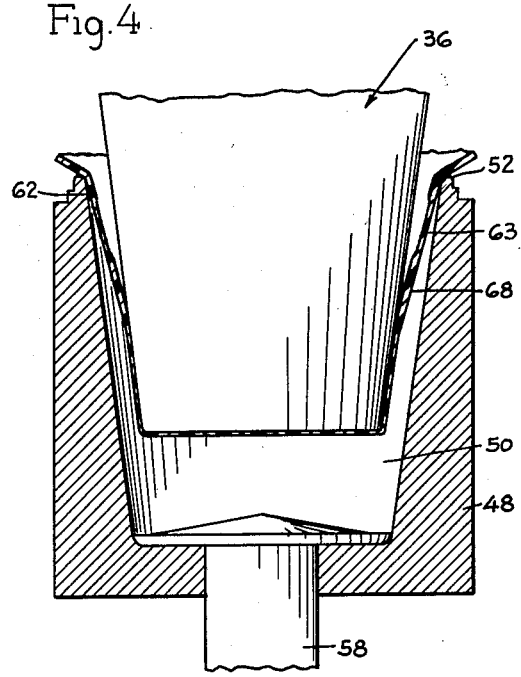
FIG. 4 is a semi-diagrammatic showing similar to FIG. 3 illustrating one method of accomplishing my inventive concept.

The apparatus 16 shown in FIG. 1 is a schematic presentation of sheet forming apparatus of the general type shown in the co-pending application S.N. 840,611, filed September 17, 1959, now Patent No. 3,105,270 and assigned to the same assignee, the apparatus 16 being modified as shall be discussed. The apparatus 16 comprises a supply reel 18 of suitable sheet stock plastic material such as polystyrene, polyethylene, or other thermoplastic material of similar nature. Feeding and indexing means 20 (shown schematically) feeds the sheet material 22 past a heating means 24, the heating being accomplished by infrared heaters or resistance heaters, etc., as suitable and desired. The sheet material is fed to mold means 26 which is here shown as a single cavity type. This is intended to diagrammatically represent a plurality of like mold means as shown in the aforementioned copending application. The mold means 26 essentially comprises an upper mold means 28 and a lower mold means 30. Individual clamp means 32 and 34, which are annular in configuration, have a diameter larger than the upper and lower mold means 28 and 30 and may be actuated (by means not shown) so as to engage the material prior to engagement by either of the upper and lower mold means. Other means for clamping the sheet material are known and are contemplated, as for example, the type shown in U.S. Patent 2,891,280.

The upper mold means 28 comprises a male plug member 36 which is generally frusto-conical in configuration and an annular member 40 having a clamping cut-off edge 38 thereon which is adapted to coact with the lower mold means as shall be discussed. The clamping cut-off edge 38 serves the dual purpose of clamping the material 22 around the edge of the lower mold means 30 and later providing a cut-off of the discrete article from the web of material. A post cutting operation may be substituted rather than separation of the molded articles from the web in the mold if desired. Actuator means 42, here shown diagrammatically as cam means, is operable to cause axial movement of the upper mold means 28. Air inlet means 44 extend through the plug 36 for introducing air under pressure for purposes to be later described.

The lower mold means 30 may be mounted on a platen and comprises a block 48 having a generally frusto-conical cavity 50. The upper edge of the cavity 50 is formed with a lip portion 52 and an annular shoulder 54 serves as a clamping cut-off edge for cooperation with the edge 38 of the upper mold means 28.

The sequential operation of the apparatus in general comprises the feeding of a discrete amount of plastic sheet material which has been heated by the heater 24 between opposed mold means 28 and 30, clamping the material in the clamp means 32 and 34, relatively moving the sheet material in the upper mold portion 30 so as to cause the mandrel or plug 36 to mechanically draw the material, then relatively moving the upper mold portion and the lower mold portion into telescoping relation so as to seal the material between the edges 38 and 54. After the material has been drawn to the above described position, a pressure differential is introduced across the web of material, said pressure differential being caused by either a positive air pressure introduced through inlet 44 or by applying a vacuum through suitable ports in the lower mold means 30 or a combination of the positive and negative pressure differentials. The introduction of the pressure differential causes the material to leave contact with the plug 36 and move into contact with the mold cavity 42 whereupon it is chilled. Continued relative movement of the upper and lower mold portions causes the edge 38 to shear the web around shoulder 54 whereupon the mold portions separate in a manner such that the knock-out plug 58 raises the finished article 60 for removal from the vicinity of the molding apparatus. The movement of the lower mold member is accomplished by suitable cam here shown diagrammatically at 56. The feed means 20 indexes new material into position and the cycle repeats.

The apparatus just discussed will manufacture lids and cup-like articles of medium size (as for example, in the neighborhood of ¼ inch to 10 inches in axial height and from ¾ inches to 10 inches in diameter at the mouth) having a substantially uniform wall thickness of .0015 inch to .035 inch as desired. However, because of the nature of the materials used, and the type of molding operation, substantial structural strength in the articles is often difficult to maintain, particularly in very thin articles. In certain applications the sidewalls are too thin in cross section which gives rise to undesirable flexibility. Therefore, in the manufacture of articles such as containers 60, the amount of basic raw material in the article plays a major function in the cost to the article. While substantially uniform in thickness articles may be produced, complete uniformity is, as a practical matter, difficult to obtain. The structural strength of the thinnest portion determines the ultimate thickness of the article. Further, in certain applications, it is desired for heat insulation purposes, to have a thickened portion in the midpoint of the article for purposes of gripping by fingers.

By the method now to be discussed, portions of the article that are formed too thin for practical usage from sheet material of a selective thickness and hence normally would require the use of thicker material, may be preselectively thickened and at the same time overall amount of material in the article may be kept to a minimum. Consequently, cost savings are enjoyed. Further, the thickened areas, by proper design may provide a strut or rib action in an article.

For better understanding of the instant invention, a discussion of the general characteristics of one particular thermoplastic material will prove beneficial. One material 22 which is quite suitable to sheet forming molding in the above-described apparatus is rubber modified polystyrene, which may be of the type sold by Dow Chemical Corporation as formula 475B. The extrusion temperature of this sheet material 22, when it is first formed is approximately 400° F. The material 22 freezes at a temperature of approximately 195° F. and the molding temperature of the sheet 22 when in the mold means 26 is in the approximate range of 240° F. to 285° F. When the sheet temperature is below 240°, the pressures required for molding become rather large and when the sheet temperature exceeds 285° F., the sheet material sags excessively and it is difficult to transport from the heating means 24 to the vicinity of the mold means 26. It has been found that when the sheet 22 located between the mold means 28 has a temperature differential between various portions thereof which exceeds approximately 5° F., a detectable thickening will occur in the finished product. The greater the temperature differential between adjacent relatively hot and cool portions, the more the hotter portions will stretch relative to the cool portions. Since the freezing points, melting points, and temperature plasticity curves, for each plastic material vary, the above described temperatures are to be considered illustrative only.

Figure 5:
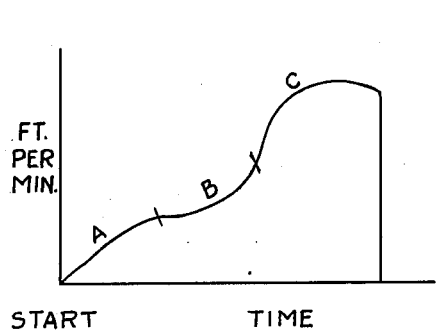
FIG. 5 is a graph similar to FIG. 3 showing the modification in the relative telescoping movement of the male and female mold members.
Figure 8:
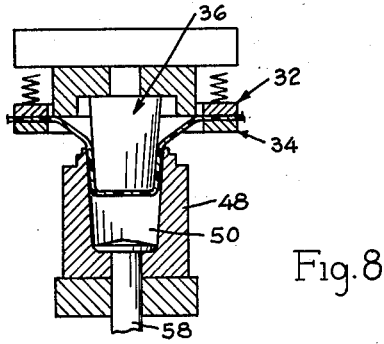
FIG. 8 is a semi-diagrammatic view similar to the mold portion shown in FIG. 1 illustrating the relative relationship of the parts during an intermediate portion of the molding cycle.
Figure 9:
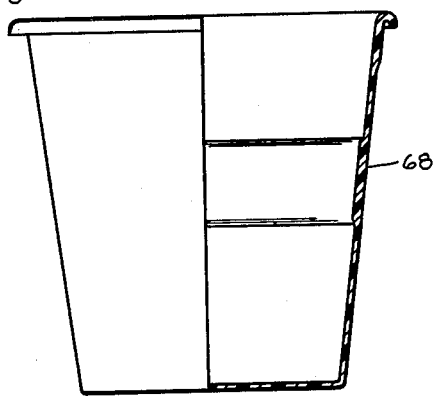
FIG. 9 is a partial sectional view of an article formed by the mold means illustrated in FIGS. 4 through 7, the wall thickness shown being greatly enlarged for purposes of clarity.

As shown in FIG. 8, the plug 36 substantially predraws the material by moving relative to the clamp means 32–34 so as to preliminarily stretch the material. Thereafter the upper mold means and lower mold means telescope into each other. As shown in FIG. 2, as the plug 36 enters into the cavity 50, the material is stretched further. The cavity block 48 is normally chilled and as the material is being stuffed into the mold by the plug, the portion 62 of the material is normally thicker than the portion of the material that is closely adjacent to the plug. Thus, the edge 52 acts somewhat as a drag causing a further stretching of the material as a telescoping relationship of the upper and lower mold means occur. The final result, with an article molded by the prior art as shown in FIG. 2, is that the wall thickness of the material is always slightly greater at the top of the article 60 than it is adjacent to the bottom. Referring to the graph shown in FIG. 3, it will be seen that a predetermined curve of relative approaching movement of the upper and lower mold means is plotted against time. By varying the relative speed of movement of the plug 36 and the mold cavity 50 towards each other, an intermediate thickened portion 68 may be formed in the article 60b. This occurs in much the same fashion as though taffy were being pulled with a jerky motion. The intermediate wall area becomes a thicker portion 68 in the sidewall of the article and is in the form of a horizontal band. This occurs by slowing down the relative movement of the molds in area B of the graph in FIG. 5. The movement is then speeded up in area C and the wall area 63 above 68 thins down again.

Figure 7:
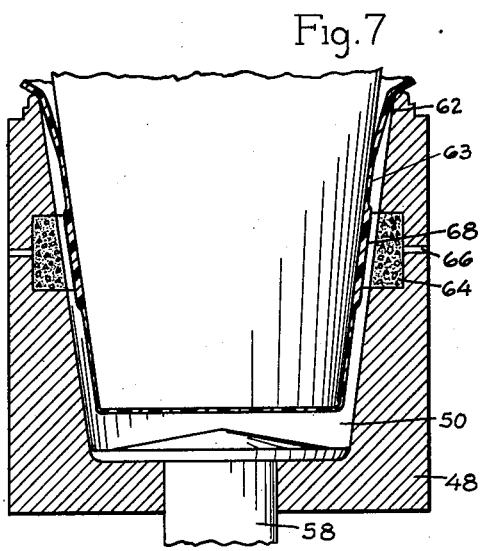
FIG. 7 is a view similar to FIG. 6 showing continued relative approaching movement of the mold members.
Figure 6:
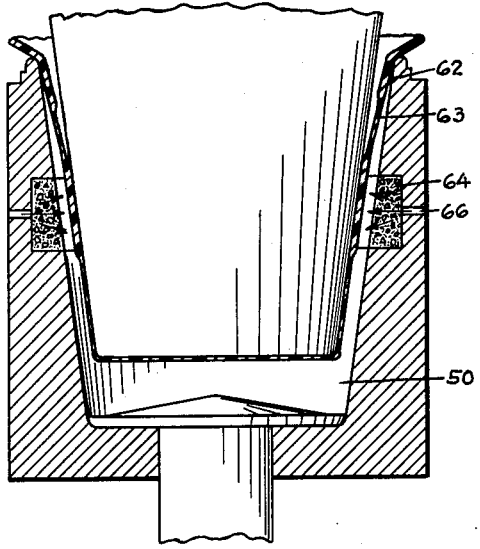
FIG. 6 is a view similar to FIGS. 2 and 4 showing a modified female mold member introducing a chilling blast of air to the sheet material during the relative approaching movement of the mold members.

To make the horizontal band or thickened portion 68 more pronounced, the sidewalls of the mold cavity 50 may be formed with an annular sintered insert 64 which has communication with an air inlet means 66. When air is introduced under pressure through the ring 64, this will tend to chill that portion of the sidewalls of the container that is immediately opposite the ring at that stage of the molding operation. The introduction of air through port 66 is only momentary and hence the article will continue thinning down in the upper portion of the sidewalls thereof as shown in FIG. 7.

Although specific embodiments have been shown and described, it is with full awareness that many modifications are possible. The invention, therefore, is not to be restricted except that insofar as is necessitated by the prior art and by the spirit of the appended claims.

What is claimed as the invention is:

1. A method of forming selected thick portions in a finished article made from uniform thickness sheet stock plastic material comprising the steps of relatively moving opposed female cavity mold member and male plunger mold member toward each other and which are disposed on opposite sides of a firmly clamped web of substantially uniform in thickness plastic material heated to a temperature sufficient to afford ready stretching thereof, then cooling selected portions only of the clamped heated plastic material by one of said female and male mold members and to a temperature sufficiently low so as to prevent ready stretching of said selected portions by varying the relative speed of approaching movement of said male and female mold members after initial contact of said web by portions of each of said male and female mold members and applying a pressure differential to opposite sides of said web of material to stretch the remaining non-cooled portions to decrease the thickness thereof and provide an article with selected thick and thin portions thereon.

2. The method set forth in claim 1 wherein the relative approaching speed of movement of the male and female members after contact by portions of each of said mold members with said web of material varies from a first relatively fast speed to a second relatively slow speed and then to a relatively fast third speed, the slow second speed causing less stretching of the material than the first and third speeds, and introducing a cold blast of fluid through the walls of said female mold member to selectively chill portions of said web while said mold members are moving at said second speed.

References Cited in the file of this patent

UNITED STATES PATENTS

| | | |
|---|---|---|
| 2,336,821 | Wadman | Dec. 14, 1943 |
| 2,336,822 | Wadman | Dec. 14, 1943 |
| 2,468,697 | Wiley | Apr. 26, 1949 |
| 2,878,513 | Slaughter | Mar. 24, 1953 |
| 2,924,852 | Michalko | Feb. 16, 1960 |
| 2,962,758 | Politis | Dec. 6, 1960 |

FOREIGN PATENTS

| | | |
|---|---|---|
| 200,129 | Australia | Nov. 2, 1955 |
| 1,224,425 | France | Feb. 8, 1960 |
| 613,809 | Canada | Jan. 31, 1961 |